(12) United States Patent
Helms

(10) Patent No.: US 11,768,675 B2
(45) Date of Patent: Sep. 26, 2023

(54) SYSTEM AND METHOD FOR ENSURING AN APPLIANCE IS USING THE LATEST OPERATING SOFTWARE

(71) Applicant: Haier US Appliance Solutions, Inc., Wilmington, DE (US)

(72) Inventor: Chad Michael Helms, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/542,615

(22) Filed: Dec. 6, 2021

(65) Prior Publication Data

US 2023/0176845 A1 Jun. 8, 2023

(51) Int. Cl.
*G06F 8/65* (2018.01)
*G06F 21/31* (2013.01)
*G06F 9/4401* (2018.01)

(52) U.S. Cl.
CPC .............. *G06F 8/65* (2013.01); *G06F 9/4406* (2013.01); *G06F 21/31* (2013.01)

(58) Field of Classification Search
CPC ..... G06F 8/60–66; G06F 9/4406; G06F 21/31
USPC .................................................. 717/168–178
See application file for complete search history.

(56) References Cited

U.S. PATENT DOCUMENTS

| | | | |
|---|---|---|---|
| 9,141,370 B1 * | 9/2015 | Nay | G06F 8/61 |
| 9,239,718 B2 | 1/2016 | Grinberg | |
| 10,452,386 B1 | 10/2019 | Kulchytskyy | |
| 10,719,309 B2 * | 7/2020 | Willis | G06F 8/65 |
| 10,732,961 B1 | 8/2020 | Madasamy | |
| 2011/0289499 A1 * | 11/2011 | Haubold | G06F 8/65 717/173 |
| 2017/0060567 A1 * | 3/2017 | Kim | H04L 41/082 |
| 2021/0224060 A1 | 7/2021 | Mukundala | |
| 2022/0066766 A1 * | 3/2022 | Mysore Shantamurthy | G06F 8/65 |

FOREIGN PATENT DOCUMENTS

| | | | | |
|---|---|---|---|---|
| EP | 3674889 A1 * | 7/2020 | | |
| WO | WO-2020082641 A1 * | 4/2020 | ............... | G06F 8/65 |

OTHER PUBLICATIONS

Yamunathagam, D., et al., Smart care-predictive maintenance system in washing machine using IOT, Jour of Adv Research in Dynamical & Control Systems, vol. 10, 03-Special Issue, 2018, 5 pages, [retrieved on May 11, 2023], Retrieved from the Internet: <URL: https://www.researchgate.net/>.*

* cited by examiner

*Primary Examiner* — Geoffrey R St Leger
(74) *Attorney, Agent, or Firm* — Dority & Manning, P.A.

(57) ABSTRACT

An appliance includes a wireless communication module in wireless communication with a remote server through an external network and a controller operably coupled to the wireless communication module. A method of ensuring that the appliance is using the latest operating software includes detecting a software verification trigger (such as the replacement or maintenance of a control board), obtaining a current software version and a latest software version, determining that the current and latest software versions do not match, and initiating a software update process to update the controller to the latest software version.

19 Claims, 4 Drawing Sheets

SYSTEM AND METHOD FOR ENSURING AN APPLIANCE IS USING THE LATEST OPERATING SOFTWARE

FIELD OF THE INVENTION

The present subject matter relates generally to appliances, or more specifically, to methods of updating the operating software of appliances.

BACKGROUND OF THE INVENTION

Conventional residential appliances commonly receive software updates throughout the lifetime of the appliance. For example, many of these appliances are network-connected "smart" appliances that are capable of directly receiving push updates directly from the appliance manufacturer, e.g., through a network connection with manufacturer servers. The manufacturers of refrigerators, dishwashers, washing machines, dryers, oven appliances, and other residential appliances commonly develop new software that is intended to address performance issues, fix operating bugs, cure security loopholes, and generally improve appliance performance. It is preferable to maintain the operating software of these residential appliances updated to the latest software versions.

However, a variety of situations may occur that result in prior versions of software being run on residential appliances. For example, when a service technician needs to replace a control board within an appliance, the software version contained on that control board may not match the version of software that was previously on the appliance. In addition, maintenance technicians commonly revert the operating software to a prior version when issues arise, and the operating software is not always updated to the latest version after service. Certain conventional residential appliances may even automatically revert to prior software versions after losing power or shutting down due to an operating fault. These appliances commonly fail to communicate these issues related to operating software and the appliance may therefore run for extended periods without the latest updates.

Accordingly, systems and methods for ensuring that appliances are operating with the latest software versions would be desirable. More specifically, a method for updating software in residential appliances in a manner that is streamlined and not burdensome for an appliance owner would be particularly beneficial.

BRIEF DESCRIPTION OF THE INVENTION

Advantages of the invention will be set forth in part in the following description, or may be apparent from the description, or may be learned through practice of the invention.

In one exemplary embodiment, an appliance is provided including a cabinet, a wireless communication module in wireless communication with a remote server through an external network, and a controller in operative communication with the wireless communication module. The controller is configured to detect a software verification trigger, obtain a current software version and a latest software version, determine that the current software version is different than the latest software version, and initiate a software update process to update the controller to the latest software version.

In another exemplary embodiment, a method of operating an appliance is provided. The appliance includes a wireless communication module in wireless communication with a remote server through an external network and a controller operably coupled to the wireless communication module. The method includes detecting a software verification trigger, obtaining a current software version and a latest software version, determining that the current software version is different than the latest software version, and initiating a software update process to update the controller to the latest software version.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
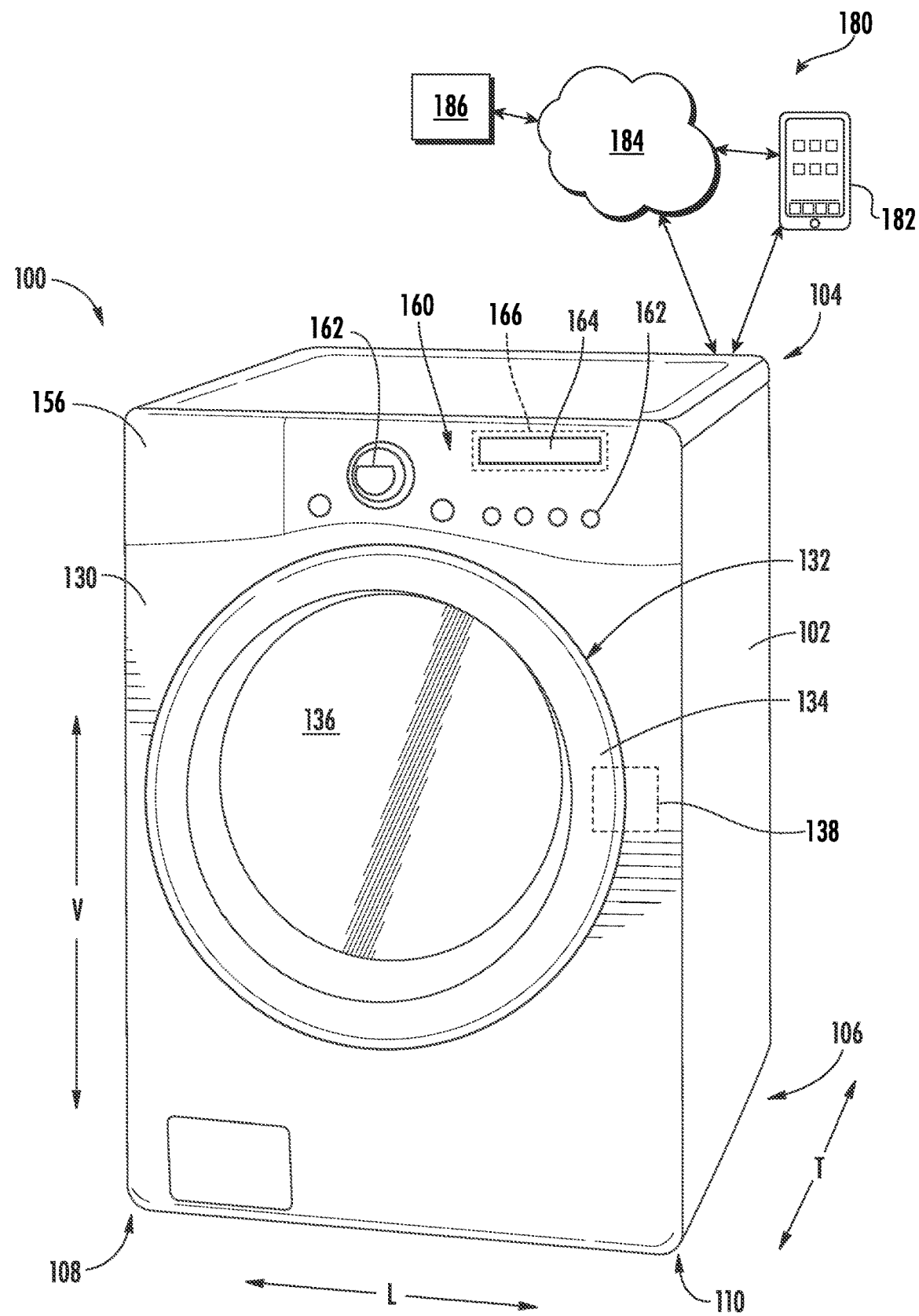
FIG. 1 provides a perspective view of an exemplary washing machine appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
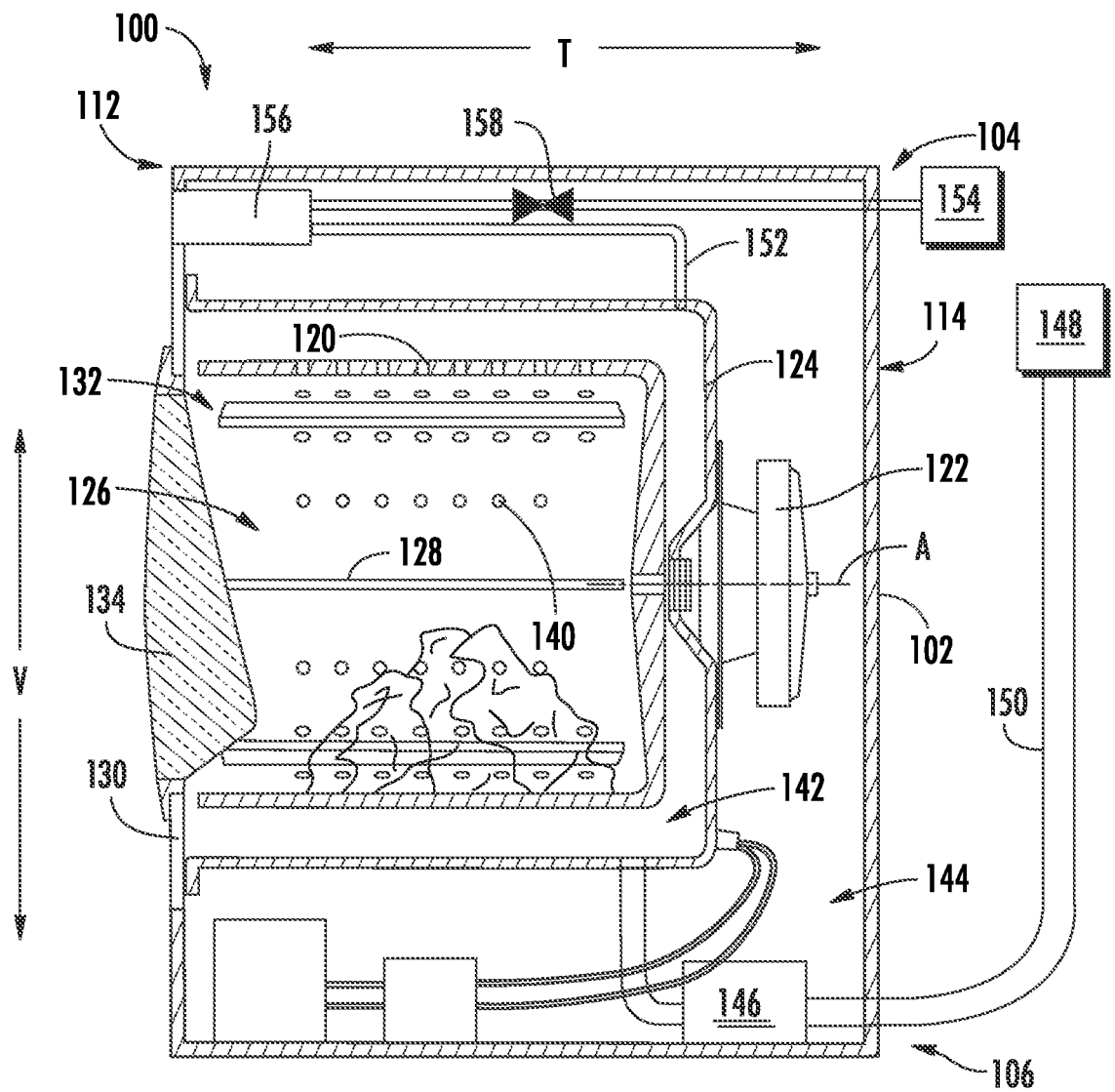
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing and/or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 and/or door 134 for selectively locking door 134 in the closed position and/or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

During operation of washing machine appliance 100, laundry items are loaded into wash basket 120 through opening 132, and washing operation is initiated through operator manipulation of one or more input selectors or using a remote device (see below). Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods as disclosed herein. For example, in some embodiments, methods disclosed herein may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases and/or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 1, a schematic diagram of an external communication system 180 will be described according to an exemplary embodiment of the present subject matter. In general, external communication system 180 is configured for permitting interaction, data transfer, and other communications between washing machine appliance 100 and one or more external devices. For example, this communication may be used to provide and receive operating parameters, user instructions or notifications, performance characteristics, user preferences, or any other suitable information for improved performance of washing machine appliance 100. In addition, it should be appreciated that external communication system 180 may be used to transfer data or other information to improve performance of one or more external devices or appliances and/or improve user interaction with such devices.

For example, external communication system 180 permits controller 166 of washing machine appliance 100 to communicate with a separate device external to washing machine appliance 100, referred to generally herein as an external device 182. As described in more detail below, these communications may be facilitated using a wired or wireless connection, such as via a network 184. In general, external device 182 may be any suitable device separate from washing machine appliance 100 that is configured to provide and/or receive communications, information, data, or commands from a user. In this regard, external device 182 may be, for example, a personal phone, a smartphone, a tablet, a laptop or personal computer, a wearable device, a smart home system, or another mobile or remote device.

In addition, a remote server 186 may be in communication with washing machine appliance 100 and/or external device 182 through network 184. In this regard, for example, remote server 186 may be a cloud-based server 186, and is thus located at a distant location, such as in a separate state, country, etc. According to an exemplary embodiment, external device 182 may communicate with a remote server 186 over network 184, such as the Internet, to transmit/receive data or information, provide user inputs, receive user notifications or instructions, interact with or control washing machine appliance 100, etc. In addition, external device 182 and remote server 186 may communicate with washing machine appliance 100 to communicate similar information.

In general, communication between washing machine appliance 100, external device 182, remote server 186, and/or other user devices or appliances may be carried using any type of wired or wireless connection and using any suitable type of communication network, non-limiting examples of which are provided below. For example, external device 182 may be in direct or indirect communication with washing machine appliance 100 through any suitable wired or wireless communication connections or interfaces, such as network 184. For example, network 184 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 180 is described herein according to an exemplary embodiment of the present subject matter. However, it should be appreciated that the exemplary functions and configurations of external communication system 180 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 3:
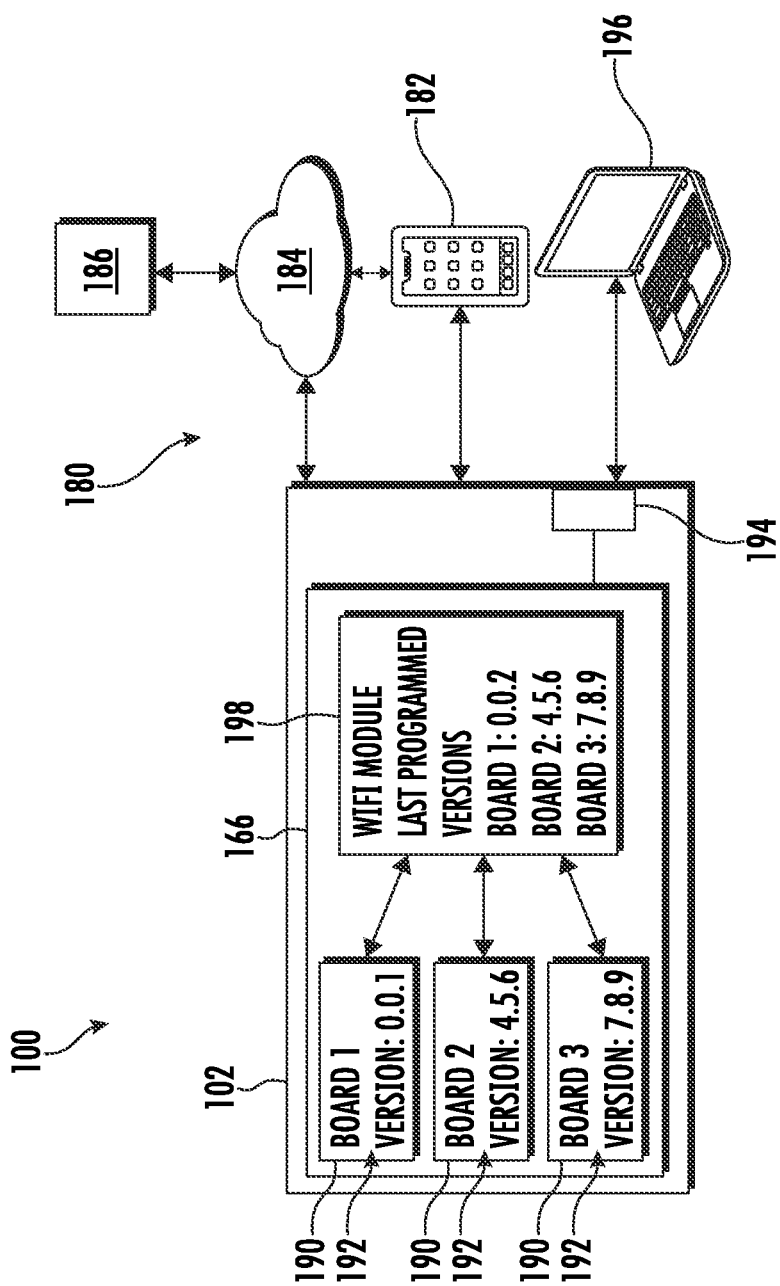
FIG. 3 provides an exemplary control board that may be used with the exemplary washing machine appliance of FIG. 1 in accordance with one embodiment of the present disclosure.

Referring now briefly to FIG. 3, a schematic illustration of an exemplary control system of washing machine appliance 100 is provided, including controller 166, external communication system 180, etc. As illustrated, controller 166 may include one or more control boards 190 that generally make up appliance controller 166. It should be appreciated that control boards 190 are only exemplary and do not show all elements or features of an appliance controller. According to exemplary embodiments, control boards 190 may include any suitable number and type of electronic components to facilitate appliance operation. For example, control boards 190 may include a power supply or power regulating assembly that is directly coupled to an electrical source, e.g., such as a mains electricity supply. In addition, according to alternative embodiments, controller 166 may include or be embodied by a single control board 190 for operating washing machine appliance 100.

Notably, according to exemplary embodiments of the present subject matter, controller 166 may generally include an operating software segment (e.g., identified generally by reference numeral 192) that is configured to operate washing machine appliance 100 or some subset of features/functions of washing machine appliance 100. In this regard, the operating software segment 192 is the segment of operating code or portion of controller 166 that regulates appliance operation, features, functions, etc. Thus, for example, when a user of the appliance performs an operating cycle, operating software segment 192 may receive operating cycle commands and parameters, e.g., selected through control panel 160 or remote device 182, and may facilitate operation of washing machine appliance 100 in accordance with such parameters.

As illustrated, washing machine appliance 100 may generally include an external communication port 194 that is positioned on cabinet 102 or which is otherwise accessible through cabinet 102. In general, external communication port 194 may be any suitable communications interface for interacting with an external source or device (identified herein generally by reference numeral 196). For example, according to exemplary embodiments, external communication port 194 may be an RJ45 network interface, a universal serial bus ("USB") interface, or any other suitable communications interface. According to exemplary embodiments, external communication port 194 is directly electrically and communicatively coupled to an appliance control board 190 (e.g., controller 166).

External communication port 194 may generally be configured for facilitating wired communications between external device 196 and the associated appliance (e.g., such as washing machine appliance 100). For example, external communication port 194 may be used facilitate appliance programming, to perform appliance maintenance, to adjust operating parameters, to modify the operating software or initiate version changes, or to perform any other action using washing machine appliance 100.

Although FIG. 3 illustrates multiple control boards 190, each including a single segment of operating software 192, it should be appreciated that fewer or additional control boards and operating segments may be used independently or in conjunction with those illustrated in FIG. 3 while remaining within the scope of the present subject matter. In this regard, washing machine appliance 100 may include any suitable number of control boards 190 having any suitable number and segments of operating software 192 that may operate together to perform functions of washing machine appliance 100, and which may be independently updated or operated under different versions numbers. These control boards 190 and the operating software 192 they contain may be generally identified herein as a controller 166.

Referring still to FIG. 3, controller 166 is generally mounted within the appliance 100 and may include a wireless communication module 198 that may facilitate communication with external devices, e.g., via external communication system 180. Specifically, according to exemplary embodiments of the present subject matter, a wireless communication module 198 may be used to communicate with network 184, remote server 186, remote device 182, and/or external device 196. For example, wireless communication module 198 may be in communication with remote server 186 (e.g., the manufacturer's server) for receiving over the air (OTA) software updates to improve appliance performance or to address operating bugs. As will be described below, wireless communication module 198 may also be configured to detect discrepancies between the current operating software version and the latest operating software version. Wireless communication module 198 may also be configured to initiate a software update process to ensure the appliance is using the latest operating software.

For example, operating software segment 192 may periodically need to be altered, e.g., by the manufacturer or a maintenance technician to address programming bugs, to add new or improved operating features, to update operating parameters, etc. According to exemplary embodiments, controller 166 is structured so that the appliance operating segment 192 may be updated and these updates may be generally identified by version number or any other version identifier. As explained briefly above, situations may arise where prior versions of operating software are run on an appliance, e.g., such as when a control board is replaced or updated with the prior operating software, automatic reversion in the event of an operating fault or repeated errors, etc. However, conventional appliances commonly fail to communicate these issues related to operating software and the appliance may therefore run for extended periods without the latest updates. Accordingly, aspects of the present subject matter are directed to streamlined methods for detecting appliance operation with incorrect software and implementing corrective action.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in any other suitable appliance, particularly those utilized in a residential or commercial setting. For example, aspects of the present subject matter may be utilized in refrigerators, ovens, dishwashers, etc.

Now that the construction of washing machine appliance 100 and the configuration of controller 166 and external communication system 180 have been presented according to exemplary embodiments, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. Moreover, method 200 may be used to update software in any appliance, particularly network-connected residential or commercial appliances. In exemplary embodiments, the various method steps as disclosed herein may be performed by controller 166 or a separate, dedicated controller.

Figure 4:
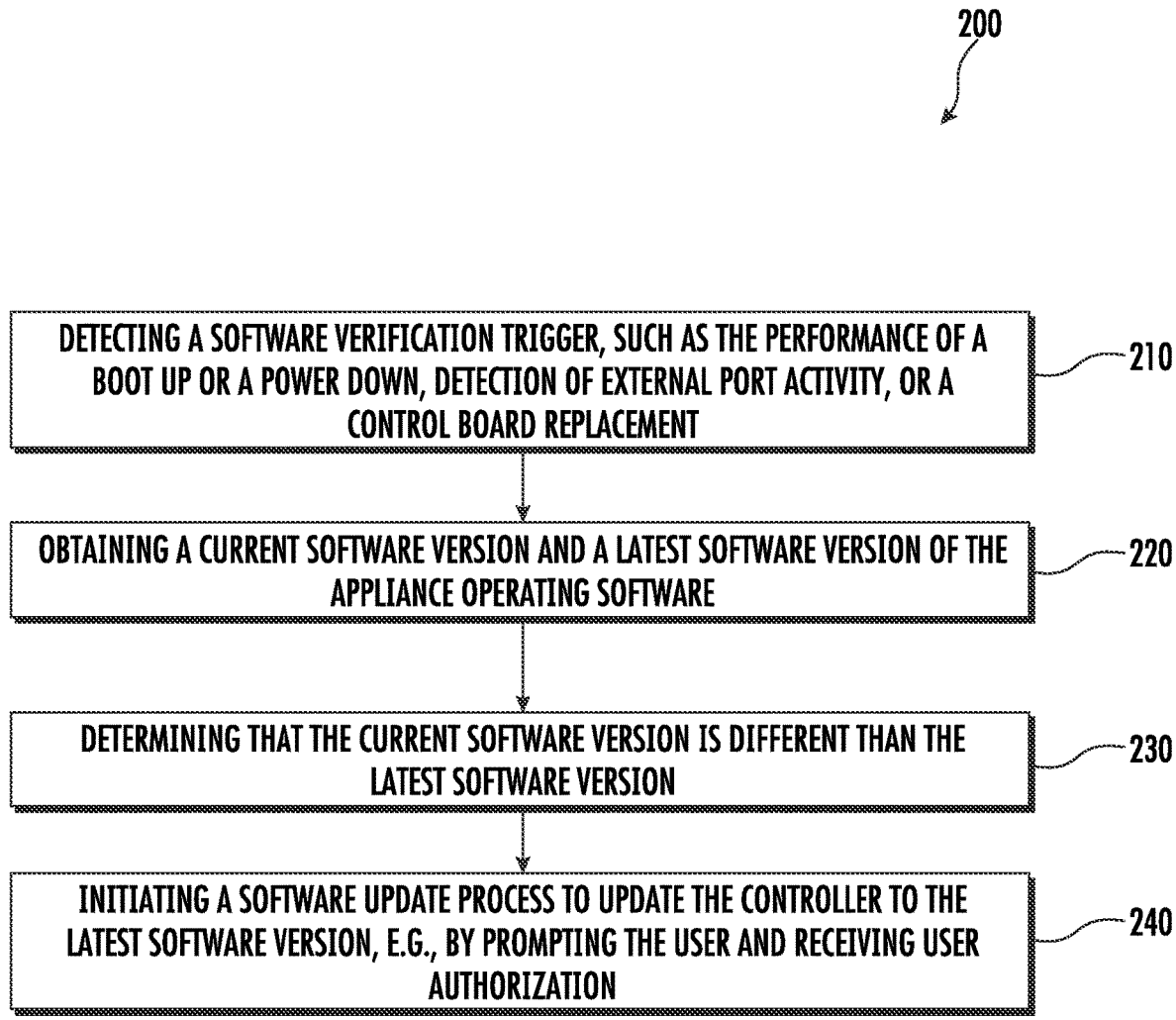
FIG. 4 illustrates a method for operating a washing machine appliance in accordance with one embodiment of the present disclosure.

Referring now to FIG. 4, method 200 includes, at step 210, detecting a software verification trigger associated with an appliance. In this regard, continuing the example from above, step 210 may include detecting a software verification trigger for washing machine appliance 100. In general, the software verification trigger may be any event, condition, or other set of circumstances that occur and indicate that the current version of one or more segments of operating software should be checked or verified to ensure that it is the latest software version.

Notably, these software verification triggers are particularly suitable or desirable after the latest version of operating software has been installed in the appliance but is removed for some reason, such as a maintenance visit or the installation of a new board (as described above). In such a situation, instead of repeatedly or periodically checking the software versions to ensure they are the desired versions, the software verification may be performed only when these triggers occur.

For example, according to an exemplary embodiment, detecting the software verification trigger may include determining that a boot up process or a recommissioning of an appliance has been initiated. For example, if the power has been removed from the appliance for a predetermined time period, the appliance may automatically enter a reboot process which may constitute a software verification trigger. In this regard, if power has been removed for longer than 30 seconds, 1 minute, or some other time period, the appliance may be programmed to revert to an installed version of software that is different than the latest software version. Accordingly, removal power for such a time period may result in the determination of a software verification trigger.

In addition, if an appliance owner or maintenance technician requests that the appliance be recommissioned, this may constitute a software verification trigger. Similarly, the appliance may be reverted back to a default state or condition, e.g., such as reverting back to a default factory state upon having a particular menu selection input or a button sequence or combination, and this reversion back to defaults may constitute a software verification trigger. It should be appreciated that the software verification triggers described herein are only exemplary and are not intended to limit the scope of the present subject matter in any manner. Indeed, according to exemplary embodiments, any detectable change in the appliance operation or other external stimulus may constitute a software verification trigger.

According to still other embodiments, the software verification trigger may include any physical interaction with or change of controller 166 or other portions of washing machine appliance 100. For example, detecting the software verification trigger may include identifying any interaction with external communication port 194. For example, if external device 196 is plugged into the external communication port 194 (e.g., the RJ45 port) to initiate a maintenance visit, this may constitute a software verification trigger. In addition, if the controller 166 detects that a control board has been replaced, an adjustment has been made to a control board, or any other action has been taken to change how the control board operates, this may constitute a software verification trigger. Regardless of the type of software verification trigger, this trigger may result in the performance of steps 220 through 240 (described below) in order to verify the software versions and install the latest software versions if available.

More specifically, step 220 may include obtaining a current software version and a latest software version of the appliance operating software. In this regard, for example, wireless communication module 198 may have knowledge of the latest software versions obtain, e.g., by virtue of being in communication with a remote server 186 and installing those software versions (e.g., wireless communication module 198 may retain a copy). For example, controller 166 may include flash memory, e.g., stored on wireless communication module 198, that updates or maintains a record of the latest installed version of operating software for each control board (e.g., as shown in FIG. 3) when it is installed. According to still other embodiments, the latest software version may be received from remote device 182, remote server 196, or any other suitable source.

Step 220 also includes obtaining the current software version, which may be obtained by querying each respective board 190 of controller 166. Thus, when a board is replaced or another event described herein occurs such that the software version is reverted to a prior version, wireless communication module 198 may not always be informed or aware of such a change. The software verification trigger detected at step 210 may be a useful indicator that the software should be verified to detect such a change. Step 220 may obtain the current software version to perform such a verification.

Method 200 may then include a comparison between the current software version (e.g., the software version being implemented by controller 166) and the latest software version (e.g., the version of software that was previously installed on each respective control board 190). Specifically, step 230 may include determining that the current software version is different than the latest software version. In this regard, referring again to FIG. 3, the second and third control boards 190 include current software versions that match the latest available versions (e.g., versions 4.5.6 and 7.8.9, respectively). By contrast, the first control board 190 has a current software version of 0.0.1 and a latest software version of 0.0.2. Accordingly, step 230 may include determining that the software versions do not match.

Step 240 includes initiating a software update process to update the controller to the latest software version. In this regard, when the current operating software version is not identical to the latest operating software version, it may be desirable to update the software by reinstalling the latest software version. According to exemplary embodiments, wireless communication module 198 may include the latest operating version (e.g., the version retained upon the latest update) and may directly update control board 190. Alternatively, wireless communication module 198 may indirectly update the latest software version via the remote server 186 and the network 184.

Notably, updating the software may cause washing machine appliance 100 to be temporarily inoperative or cause certain functions/features to be deactivated. Accordingly, it may be desirable to inform the user that the software should be updated and seek confirmation or scheduling regarding such an update process. In this regard, for example, method 200 may include transmitting a user prompt to authorize the software update process. For example, this user prompt may be sent to the user through control panel 160 or to remote device 180 via network 184 (e.g., to the user's cell phone). The user may then use remote device 182 to schedule the software update or to approve and immediately initiate the software update. Accordingly, method 200 may include receiving a software update authorization from a user (e.g., via input selectors 162 on control panel 160 or through a remote device 182). Once a software update process has been initiated and the user has authorized the software update, method 200 may include performing the update process to ensure that the current operating software versions match the latest software version.

FIG. 4 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that this method may be applied to the operation of any other appliance, particularly any connected residential appliance.

As explained above, aspects of the present subject matter are generally directed to systems and methods for detecting the installation of downgraded of appliance operating software on an individual control board within an appliance. The method may further include re-prompting the user to apply a previously applied over-the-air (OTA) software update to bring the appliance back up to date. For example, the appliance Wi-Fi module (e.g., the programming entity) may read the software versions from all controls within an appliance and compare them to the versions that were programmed during the last OTA update. For example, the Wi-Fi Module performs this version check at boot up, and if any version is different the versions stored from the last update, the Wi-Fi Module may clear the current appliance version and update to the latest available version to the OTA that that is communicated to the cloud/mobile software application. The mobile software application can see that an update is available and prompt the user to re-apply the update. Once a software update is complete, the programmed versions for each control board may be stored to flash memory for future version comparisons.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance comprising:
    a cabinet;
    a wireless communication module in wireless communication with a remote server through an external network; and
    a controller comprising a plurality of control boards, each of the plurality of control boards being in operative communication with the wireless communication module, the controller being configured to, for each respective board of the plurality of control boards:
    detect a software verification trigger;
    obtain a current software version and a latest software version;
    determine that the current software version is different than the latest software version; and
    initiate a software update process to update the controller to the latest software version.

2. The appliance of claim 1, wherein detecting the software verification trigger comprises:
    determining that a boot up process of the appliance has been initiated.

3. The appliance of claim 1, wherein detecting the software verification trigger comprises:
    determining that power has been removed from the appliance for a predetermined time period.

4. The appliance of claim 1, wherein the appliance further comprises an external communication port positioned on the cabinet, and wherein detecting the software verification trigger comprises:
    detecting port activity at the external communication port.

5. The appliance of claim 4, wherein the external communication port is an RJ45 port.

6. The appliance of claim 1, wherein detecting the software verification trigger comprises:
    detecting replacement of a control board or maintenance activity on the control board.

7. The appliance of claim 1, wherein the wireless communication module is configured to obtain the current software version and the latest software version.

8. The appliance of claim 1, wherein obtaining the current software version comprises receiving the current software version from flash memory on the controller.

9. The appliance of claim 1, wherein the controller is part of the wireless communication module.

10. The appliance of claim 1, wherein initiating the software update process to update the controller to the latest software version comprises:
    transmitting a user prompt to authorize the software update process;
    receiving a software update authorization from a user; and
    performing the software update process.

11. The appliance of claim 10, further comprising:
    a user interface panel, wherein the user prompt is provided through the user interface panel and the software update authorization is received through the user interface panel.

12. The appliance of claim 11, wherein the controller is in operative communication with a remote device through the external network, and wherein the user prompt is provided through the remote device and the software update authorization is received through the remote device.

13. The appliance of claim 1, wherein a copy of the latest software version is stored on the wireless communication module.

14. A method of operating an appliance, the appliance comprising a wireless communication module in wireless communication with a remote server through an external network and a controller comprising a plurality of control boards, each of the plurality of control boards being operably coupled to the wireless communication module, the method comprising, for each respective board of the plurality of control boards:

detecting a software verification trigger;

obtaining a current software version and a latest software version;

determining that the current software version is different than the latest software version; and initiating a software update process to update the controller to the latest software version.

15. The method of claim 14, wherein detecting the software verification trigger comprises at least one of determining that a boot up process of the appliance has been initiated, determining that power has been removed from the appliance for a predetermined time period, or detecting port activity at an external communication port.

16. The method of claim 14, wherein detecting the software verification trigger comprises:

detecting replacement of a control board or maintenance activity on the control board.

17. The method of claim 14, wherein obtaining the current software version comprises receiving the current software version from flash memory on the controller.

18. The method of claim 14, wherein initiating the software update process to update the controller to the latest software version comprises:

transmitting a user prompt to authorize the software update process;

receiving a software update authorization from a user; and performing the software update process.

19. The method of claim 18, wherein the controller is in operative communication with a remote device through the external network, and wherein the user prompt is provided through the remote device and the software update authorization is received through the remote device.

* * * * *